United States Patent [19]
Rudel

[11] Patent Number: 4,779,924
[45] Date of Patent: Oct. 25, 1988

[54] SEAT FOR A MOTORCYCLE

[76] Inventor: Myron G. Rudel, 284 Hoover Ave., Benton Harbor, Mich. 49022

[21] Appl. No.: 86,772

[22] Filed: Aug. 19, 1987

[51] Int. Cl.⁴ .............................................. B62J 1/00
[52] U.S. Cl. ..................... 297/195; 297/453
[58] Field of Search ..................... 297/453, 195, 243; 5/458, 461, 467

[56] References Cited

U.S. PATENT DOCUMENTS

| | | | |
|---|---|---|---|
| 1,827,124 | 10/1931 | Trudo | 297/453 |
| 2,004,106 | 6/1935 | Gaston | 5/461 |
| 3,028,201 | 4/1962 | Heckethorn | 297/453 |
| 3,146,030 | 8/1964 | Dennison et al. | 297/453 |
| 3,337,885 | 8/1967 | Crane et al. | 297/453 X |
| 3,940,166 | 2/1976 | Smithea | 297/195 |
| 4,413,857 | 11/1983 | Hayashi | 297/453 X |

FOREIGN PATENT DOCUMENTS 1527119 4/1968 France .............................. 297/195

Primary Examiner—Peter A. Aschenbrenner
Attorney, Agent, or Firm—Jerry T. Kearns

[57] ABSTRACT

A seat for attachment over an existing motorcycle seat has a generally rectangular semi-rigid wire frame on which coil springs are transversely stretched. A plurality of longitudially extending wire stabilizers are connected to the wire frame. A fabric cover having an open net top portion and perimeter and bottom portions formed of a tough, durable fabric is stretched over the wire frame. Grommets formed in the perimeter portion are utilized in conjunction with a lacing cord to secure the seat over an existing motorcycle seat. In a second embodiment, the wire frame is formed as a rectangular box and vents are provided in sidewall portions of the fabric cover. An absorbent material is disposed in an interior bottom portion of the seat and is utilized as a wick to store water for purposes of evaporative cooling.

4 Claims, 2 Drawing Sheets

SEAT FOR A MOTORCYCLE

BACKGROUND OF THE INVENTION

1. Field of the Invention

The present invention relates to seats for motorcycles, and more particularly pertains to embodiments of a new and improved motorcycle seat which functions to keep the rider cool and dry. As is well known to motorcycle riders, the typical leather or vinyl original motorcycle seats become quite hot when exposed to the sun. This results in a seat which is not only uncomfortable for the rider, but further promotes sweating which wets the riders trousers. This is both embarrassing and uncomfortable for the rider. The present invention is directed to a motorcycle seat which is placed over the existing motorcycle seat and which provides air flow passages beneath the rider to overcome the aforementioned problems.

2. Description of the Prior Art

Various types of seats having air flow passages to allow air to flow under the rider are known in the prior art. A typical example of such a seat is to be found in U.S. Pat. No. 454,211, which issued to D. Heermance on June 16, 1891. This patent utilizes a lattice assembly formed from brass slats which are supported on vertical coil springs. U.S. Pat. No. 613,295, which issued to B. McGregor on Nov. 1, 1898, discloses a seat formed from sheet metal provided with a slot and perforations for ventilation. The seat is supported by vertically extending coil springs. U.S. Pat. No. 1,076,655, which issued to A. Lowenthal on Oct. 21, 1913, discloses a seat for a motorcycle in which a rigid seat having a central aperture is supported by vertically extending coil springs. U.S. Pat. No. 1,458,909, which issued to R. Smith on June 12, 1923, U.S. Pat. No. 4,029,284, which issued to R. Swenson on June 14, 1977 and U.S. Pat. No. 4,502,727, which issued to S. Holcomb et al on Mar. 5, 1985, disclose motorcycle seats which are supported by vertically extending coil springs which allow air to flow underneath the seat.

Also, covers made of sheepskin are available for attachment over existing motorcycle seats in the hope that air will flow between the wool fibers to cool the rider. However, in practice, these seat covers quickly become soaked with sweat and matted down, thus precluding any air flow beneath the rider.

While the above mentioned devices are suited for their intended usage, none of these devices provide for an adequate flow of air to flow into contact with the riders seat and trousers and thus do not allow adequate ventilation to prevent excessive sweating by the rider. Further, none of the aforesaid devices can be readily attached over existing original equipment type motorcycle seats. Inasmuch as the art is relatively crowded with respect to these various types of seats for motorcycles, it can be appreciated that there is a continuing need for and interest in improvements to such seats, and in this respect, the present invention addresses this need and interest.

SUMMARY OF THE INVENTION

In view of the foregoing disadvantages inherent in the known types of seats for motorcycles now present in the prior art, the present invention provides an improved seat for a motorcycle. As such, the general purpose of the present invention, which will be described subsequently in greater detail, is to provide a new and improved seat for a motorcycle which has all the advantages of the prior art seats for motorcycles and none of the disadvantages.

To attain this, representative embodiments of the concepts of the present invention are illustrated in the drawings and make use of a semi-rigid wire frame and a fabric cover having an open net top portion. The invention also makes use of transversely extending coil springs stretched on the wire frame. Metal grommets provided in the fabric cover are utilized in conjunction with a lacing cord to secure the seat over an existing motorcycle seat. In one embodiment it is contemplated that an absorbent material may be utilized in the seat which, in conjunction with side vents in the fabric cover, provide for an evaporative cooling effect.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved seat for a motorcycle which has all the advantages of the prior art seats for motorcycles and none of the disadvantages.

It is another object of the present invention to provide a new and improved seat for a motorcycle which may be easily and efficiently manufactured and marketed.

It is a further object of the present invention to provide a new and improved seat for a motorcycle which is of a durable and reliable construction.

An even further object of the present invention is to provide a new and improved seat for a motorcycle which is susceptible of a low cost of manufacture with regard to both materials and labor, and which accordingly is then susceptible of low prices of sale to the consuming public, thereby making such seats economically available to the buying public.

Still yet another object of the present invention is to provide a new and improved seat for a motorcycle which provides in the apparatuses and methods of the prior art some of the advantages thereof, while simultaneously overcoming some of the disadvantages normally associated therewith.

Still another object of the present invention is to provide a new and improved seat for a motorcycle which provides passages for directing a flow of air into contact with the rider.

Yet another object of the present invention is to provide a new and improved seat for a motorcycle which may be readily attached over an existing motorcycle seat.

Even still another object of the present invention is to provide a new and improved seat for a motorcycle which provides for evaporative cooling of the rider.

A further object of the present invention is to provide a new and improved motorcycle seat which provides a fabric cover having ventilation passages to direct a flow of air beneath the rider and over a water soaked absorbent material to provide an evaporative cooling effect.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
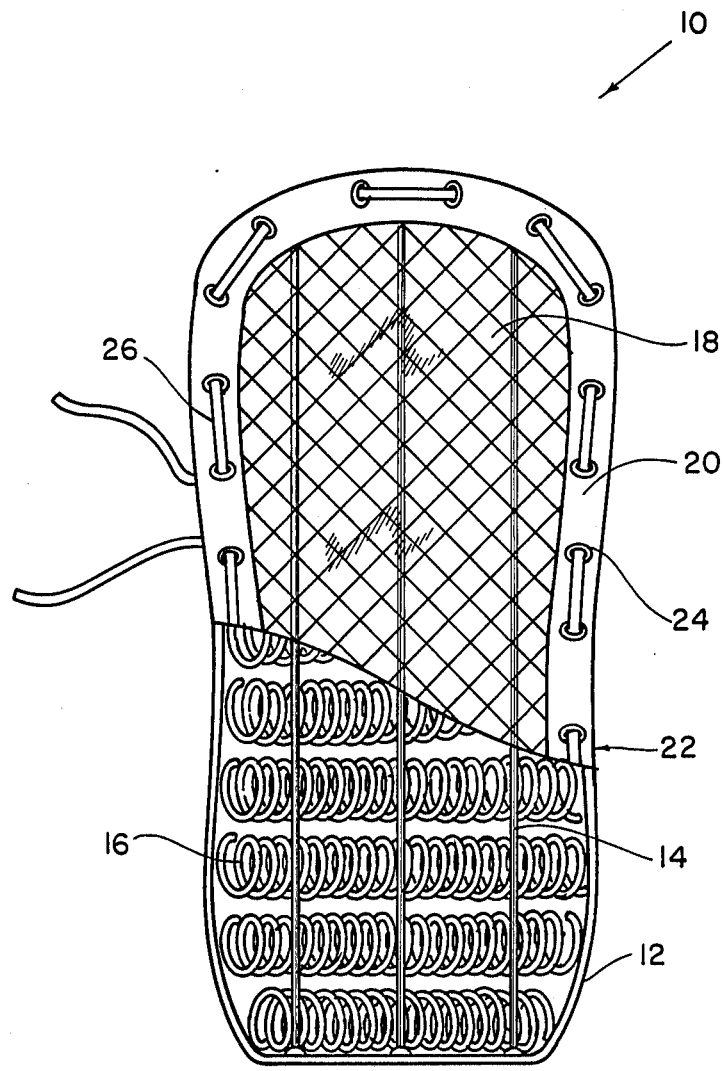
FIG. 1 is a top plan view, partially sectioned, illustrating a first embodiment of a motorcycle seat of the present invention.

With reference now to the drawings, and in particular to FIG. 1 thereof, a new and improved seat for a motorcycle embodying the principles and concepts of the present invention and generally designated by the reference numeral 10 will be described.

More specifically, it will be noted that the first embodiment 10 of the invention includes a flat, generally rectangular wire frame 12 on which a plurality of transversely extending coil springs 16 are attached. These springs 16 are spaced along the length of the wire frame 12 and are attached thereto by bending the ends around the frame or by welding. A plurality of longitudinally extending stabilizers 14 are spaced across the width of the wire frame 12. These stabilizers are likewise attached to the frame by bending the ends around the frame or by welding. These stabilizers 14 are formed from a semi-rigid wire. A fabric cover having an open net top portion 18 and perimeter 20 and bottom 22 portions is stretched over the wire frame 12. The fabric cover has been cut away in the lower portion of FIG. 1. A plurality of metal grommets 24 extend through the fabric cover and are spaced along the perimeter portion 20. A lacing cord 26 woven through the grommets is utilized to attach the seat of the present invention over an existing motorcycle seat. The lacing cord may be formed from leather or natural or synthetic fibers.

Figure 2:
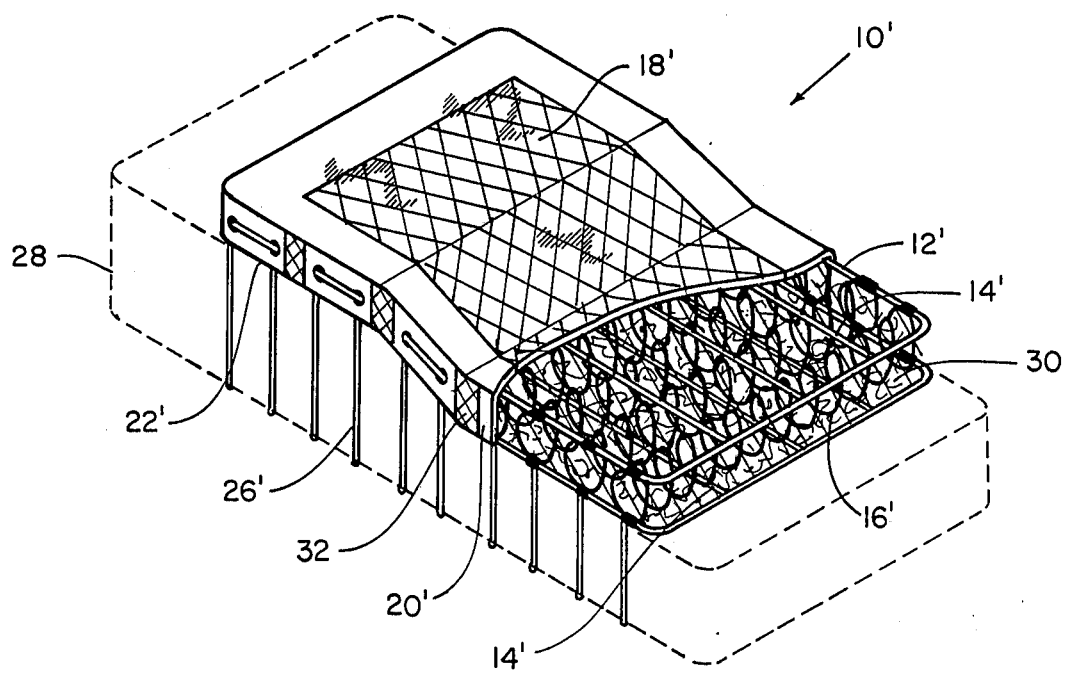
FIG. 2 is a perspective view, partially sectioned, illustrating a second embodiment of a motorcycle seat of the invention attached over and existing motorcycle seat.

With reference now to FIG. 2, a second embodiment of a motorcycle seat according to the present invention will be described. The seat 10' of the second embodiment is formed from a generally rectangular box wire frame 12'. A plurality of longitudinal stabilizers 14' which are spaced across the width of the frame are attached to the wire frame by bending the ends of the stabilizers 14' around the wire frame 12' or by welding. The stabilizers are made of a semi-rigid metal wire. A plurality of transversely extending coil springs 16' are spaced along the length of the wire frame 12', and are affixed thereto. A fabric cover having an open net top portion 18' and four sidewalls 20' and a bottom portion 22' formed from a tough, durable fabric material is stretched over the box wire frame 12'. The fabric cover has been cut away in the lower portion of FIG. 2. A plurality of grommets 24' are spaced around the sidewalls 20' and in conjunction with a lacing cord 26', are utilized to secure the seat 10' of the present invention over an existing motorcycle seat 28. As can be seen in FIG. 2, the semi-rigid nature of the wire frame 12' allows the seat 10' to conform to the contours of the existing seat 28. A highly absorbent material 30, such as cotton or synthetic fibers such as those utilized in disposable diapers is disposed along the bottom interior portion 22' of the fabric cover, inside the box frame 12'. A plurality of vents 32, formed from the same open net fabric as top portion 18', are spaced along the sidewalls 20'. In use, air flows through these vents and across the absorbent material 30, which has been previously soaked with water, thus providing an evaporative cooling effect. All metal portions are constructed of, or coated with a noncorrosive material, thus ensuring a long service life for the seat 10'.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved motorcycle seat for attachment over an existing motorcycle seat, comprising:
a generally rectangular wire frame means;

a plurality of longitudinally extending wire stabilizer means spaced across a width of said rectangular frame means;

a plurality of transversely extending coil spring means spaced along a length of said frame means;

a fabric cover means covering said frame means;

said fabric cover means having an open net top seat portion and having a bottom portion and a surrounding perimeter portion formed from a durable fabric material;

a plurality of grommets in said durable fabric material spaced around said perimeter portion of said fabric cover means;

and lace means received through said grommets for attaching said seat over an existing motorcycle seat.

2. A new and improved motorcycle seat for attachment over an existing motorcycle seat, comprising:

a generally rectangular wire box frame means;

a plurality of longitudinally extending wire stabilizer means spaced across a width of said rectangular frame means;

a plurality of transversely extending coil spring means spaced along a length of said frame means;

a fabric cover means covering said frame means;

said fabric cover means having an open net top seat portion and for sidewall portions and a bottom wall portion formed from a durable fabric material;

a plurality of grommets in said durable fabric material spaced along to opposed sidewalls of said fabric cover means;

and lace means received through said grommets for attaching said seat over an existing motorcycle seat.

3. The seat for a motorcycle of claim 2, further comprising a plurality of vent means formed in said sidewall portions.

4. The seat for a motorcycle of claim 3, further comprising absorbent material disposed within said frame means, whereby when said absorbent material is soaked with water, air flows through said vent means and across said absorbent material, thereby providing an evaporative cooling effect.

* * * * *